United States Patent [19]

Fleming, Jr.

[11] Patent Number: 5,364,427
[45] Date of Patent: Nov. 15, 1994

[54] MANUFACTURE OF OPTICAL FIBER USING SOL-GEL

[75] Inventor: James W. Fleming, Jr., Westfield, N.J.

[73] Assignee: AT&T Bell Laboratories, Murray Hill, N.J.

[21] Appl. No.: 93,226

[22] Filed: Jul. 16, 1993

[51] Int. Cl.⁵ .......................................... C03B 37/016
[52] U.S. Cl. ...................... 65/395; 65/901; 65/17.3; 65/435
[58] Field of Search ............... 65/3.11, 3.12, 18.1, 65/901; 501/12

[56] References Cited

U.S. PATENT DOCUMENTS

| | | | |
|---|---|---|---|
| 2,613,479 | 10/1952 | Stong | 65/108 |
| 3,652,248 | 3/1972 | Loxley et al. | 65/108 |
| 3,877,912 | 4/1975 | Shiraishi et al. | 65/3.11 |
| 4,154,591 | 5/1979 | French et al. | 65/3.11 X |
| 4,477,273 | 10/1984 | Lynch et al. | 65/3.12 |
| 4,680,045 | 7/1987 | Osafune et al. | 65/17 |
| 4,764,194 | 8/1988 | Maklad | 65/3.11 |
| 4,820,322 | 4/1989 | Baumgart et al. | 65/3.11 |
| 5,123,940 | 6/1992 | DiGiovanni et al. | 65/3.12 |
| 5,174,803 | 12/1992 | O'Brien | 65/3.12 X |

FOREIGN PATENT DOCUMENTS 2526569 12/1976 Germany.

*Primary Examiner*—Robert L. Lindsay
*Attorney, Agent, or Firm*—George S. Indig

[57] ABSTRACT

Bent sol-gel produced tubing is straightened by drawing, with tensile force and operating temperature to result in minimal plastic flow, so that size reduction is small. The method is usefully applied to reject recovery in the preparation of overclad tubes, which as encompassing closely-fitting core rods, form the composite preform from which optical fiber is drawn.

11 Claims, 1 Drawing Sheet

MANUFACTURE OF OPTICAL FIBER USING SOL-GEL

BACKGROUND OF THE INVENTION

1. Technical Field

The invention is concerned with fabrication of silica-based optical fiber. It contemplates use of a composite preform including a core rod and a sol-gel-derived overcladding tube.

2. Description of the Prior Art

Optical fiber has become an extremely sophisticated product. Insertion loss has been lessened to increase the length of repeaterless spans. Dispersion has been addressed to result in significant increase in capacity. Strides have been made in fiber integrity. A number of developments in the glass itself, as well as in coating materials, have resulted in a high proof-test, bend-tolerant product. For the most part, advances have been accompanied by cost increase.

Significant cost saving is due to realization that the functioning portion of the fiber is small. Prevalent single-mode fiber structures owe their performance characteristics to but a few percent of the total cross-section of the fiber. One manufacturing approach depends on drawing the fiber from a composite preform made up of a core rod encompassed within a separately prepared overcladding tube. Since little of the transmitted energy sees the outer region of the clad, requirements on this region are reduced. A commercially available overcladding tube depends on a massive tubular starting body, drawn to small diameter tubing, which, together with the core rod, makes up the composite preform.

Further cost saving will likely result by use of a sol-gel-derived overcladding tube. U.S. Pat. No. 5,240,488 issued Aug. 31, 1993, represents the breakthrough to finally realize promised cost saving. The primary obstacle to earlier use—reduced yield due to cracking of any but the very smallest bodies—is avoided by incorporation of a transient polymer in the sol. Having served to prevent cracking during drying, the polymer is removed during firing.

Fiber breakage, due to very small numbers of very small particles—contaminant particles, now carried over to the glass (in the absence of the vapor transport step of previous fabrication methods)—is avoided by particle removal, by physical separation and/or by gas reaction. (See U.S. patent applications Ser. Nos. 08/029750 and 07/029753, both filed Mar. 11, 1993.)

A final problem has arisen. The near-net shape, cast overcladding tube is subject to warpage which interferes with insertion of the closely titling core. Uneven cooling and minor differences in temperature coefficient of expansion as due to small deposits of $SiO_2$ of differing morphology—e.g., of cristobalite—are among the causes.

SUMMARY OF THE INVENTION

A drawing procedure is found useful for avoidance of warpage or for tube straightening. This simple procedure has been used for retrieval of unacceptable preform tubes.

There are two major implications. Drawing to result in little or no reduction in inside dimension, more generally to result in reduction in tube wall thickness-reduction of but no more than a few percent, may be incorporated warped tube on a tube-by-tube basis to retrieve rejects. Alternatively, the drawing step may be incorporated as a regular part of the manufacturing process. In either event, any reduction in id may be accommodated by first molding a slightly oversized or thickened wall tube.

There is another implication—outlined developments together with fiber fabrication requirements may, together, yield a new use for sol-gel produced silica glass. The sol-gel process, in the past thought promising for its near-net shape advantage, becomes a feasible bulk source for fiber production. By comparison with soot processing, sol-gel derived material offers a cost advantage. Most effective substitution of sol-gel for preparation of the "massive tube", from which smaller tubes are drawn, takes account of the gel-drying step which is both time consuming and critical in terms of likelihood of cracking. The nature of the sol-gel process suggests a variant from the procedure as now carried out with soot-derived tubes. Relatively small strength of the wet-gel body is of less consequence/or thicker wall tubing. A preferred procedure provides a gelation of such a thick wall tube, with reduction of wall thickness accomplished by, e.g., internal pressure during drawing. By this means, wall thickness may be reduced disproportionately to produce the desired final dimensions.

DETAILED DESCRIPTION

Tube Straightening

Figure 1:
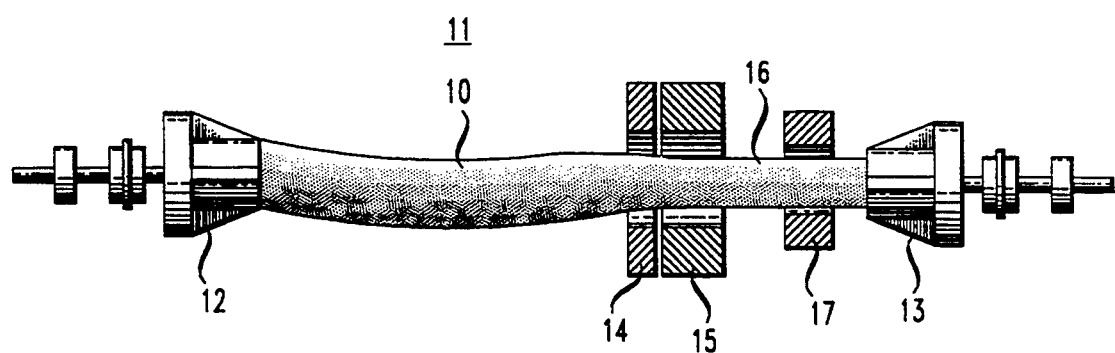
FIG. 1 is a schematic representation of draw apparatus depicting drawing of an individually cast overcladding tube.

The axial tensile force, F, of the prototypical drying process, serves to straighten the tube. A component of this drawing force operates on a bulge. This component is proportional to F (sin $\Theta$), where $\Theta$ is the angle of divergence of the bulge from the tube axis of the straight tube. The rate of straightening is determined by temperature. Straightening is discussed in terms of "plastic flow". This terminology is meant to include the relaxation which accommodates local strain (without necessary overall flow or tube lengthening).

The term "drawing" is used in its most generic sense. Likely initial commercial application will use a slightly oversized "near-net shape" tube. While size reduction may literally be avoided under exacting conditions, one or a few percent reduction may be expedient. Allowance for this size reduction may take the form of corresponding enlargement in the overall size of the cast tube. Alternatively, the as-cast tube may have a thickened wall, with thinning due to inside pressurization during "drawing". Pressurization by use of nitrogen or another inert gas may reduce id without affecting od. Either method is appropriate to individual reject retrieval, or to regular processing. In the former, the small size variation (as between straightened and unstraightened tubes may be of little consequence in the final drawn fiber).

Effective straightening takes a number of factors into account. Time may be significant. Design of the process to yield flaw-free, undistored, straightened tubing is based on a time, temperature product. For individual tubes where setup time is appreciable, there is a general preference for minimal temperature. Temperatures in the range of from 1200°–1800° C.—corresponding with viscosity values of ≈10⁹–10⁶ poise—are found suitable. In one experiment, of the procedural form of Example 2, straightening of a tube having a $\Theta=0.9°$ bulge, heating to 1450 degree over a period of 30 minutes resulted in straightening with a cross-sectional reduction of less than 2%. Higher temperatures within the range are required for assimilation of visible cristobalite deposit. Still lower temperatures may be used but require larger tensile force.

In general terms, this aspect of the invention is directed toward individually molded overclad tubes. The term "straightening", descriptive of procedures in which firing is carried out simultaneously with, or, in continuous fashion, preceding drawing. This variation might better be described as "warp-avoidance". The former term is generally used as descriptive of both procedures for expediency.

Tube Reduction

Here, the reduction is a main objective (rather than a tolerable side effect). Casting and drying a single massive tube rather than many smaller tubes is an economy. The thicker tube wall is useful in handling and may lessen incidence of cracking.

The prior art process based on drawing-reduction of a massive soot-produced preform is generally conducted to produce a proportionally decreasing id and od. The characteristics of sol-gel processing may suggest preference for disproportionate reduction. As in retrieval of reject individual tubes, the wall thickness of the massive preform may be greater. Again, thinning may be the consequence of internal pressurization by use of an inert gas during drawing. The basic process is described in the literature. (See DE2526569-A76.12.16.6.) Massive preforms are usually at least five times larger than the final drawn tube. The significance of setup time is no longer limiting with the approach. High temperatures, in general temperatures of 1800°–2200° C. are justified and permit increased throughput.

Use of internal gas pressure and/or graphite plates have been used to control the dimensions of the pulled tube. It is possible, too, to combine straightening and/or reduction with firing. Such a process may operate directly on the porous body which is the direct product of gel-drying.

Drawing Apparatus

Two general types of apparatus have been used. One provides for a vertically disposed tube supported at its upper end and with a weight at its free end. Example two used this approach. The tube may be supported at a lower end and drawn upwardly. Vertical disposition avoids sagging and off-round product.

The other approach used a horizontally-disposed lathe. The method is convenient but may require support—external and/or internal. The former is accomplished by use of graphite plates; the latter by internal pressurization. Pressurization here may or may not designedly produce wall thinning.

In any event, apparatus will provide for diameter monitoring of reduced-sized tubing by detection and feedback (adjusting either temperature or draw rate.)

Processing Conditions

Discussion here is largely in terms of the essentially pure silica which was used in experimentation. The broader compositional class of "silica-rich" glass is contemplated. This term is intended to include compositions containing at least 70 wt % $SiO_2$.

Temperature values are selected in accordance with tensile force—with a product of the two sufficient for the intended purpose. Values to meet time requirements may be determined empirically.

Operating Temperature in experimental work have been in the range of 1200° C.–1800° C., corresponding with viscosity values of from $10^{12}$ poise –$10^6$ poise. Higher temperatures perhaps to 2100° C. (viscosity of ≈$10^4$ poise), while reducing required time, may limit other operating parameters. Reduced viscosity may require short heating zones. The same consideration leads to internal pressurization even in vertical drawing.

Detailed Description of the Figures

FIG. I is a schematic view of the apparatus used in Example 1. It shows a bent tube 10 on a lathe 11 provided with chucks 12 and 13. Positioning apparatus 14 is "flee-floating"—is designed to provide for a drawing force which follows the center of the tube as introduced. Zone heating of tube 10 is by heat source 15. The diameter of the drawn tube, 16 is determined by the draw force applied e.g., to chuck 13, and by the temperature to which the tube is heated. Diameter is monitored by sensor 17.

Figure 2:
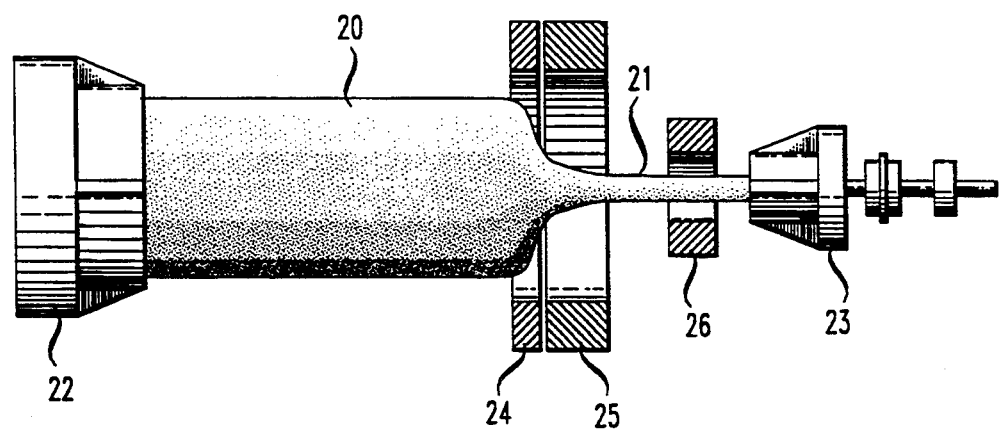
FIG. 2 is a schematic representation of draw apparatus depicting drawing from a massive preform to yield many overcladding tubes.

In FIG. 2, a massive preform tube 20 is shown in the process of twenty-fold draw-reduction to yield reduced diameter tube 21. Diagrammatic representation of the drawing apparatus includes chucks 22 and 23, positioning apparatus 24, heat source 25 and diameter sensor 26. Design is discussed in the cited German patent. Real apparatus includes draw means, e.g., acting on movable chuck 23, together with a feedback loop to make use of sensing information to vary temperature and/or draw rate, etc.

EXAMPLES

Two procedures have been carried out experimentally. A drawing force has been applied to the tube as heated or unheated. In other work, it was applied at room temperature, and the rube was subsequently heated to the extent necessary for straightening. It is possible that commercial practice will dictate something intermediate to the two—i.e., applying the drawing force to a tube heated to a degree insufficient for straightening—elastically or plastically—followed by further heating.

Drawing has been carried out on a lathe. It has also been based on vertical drawing with a simple weight.

EXAMPLE 1

A fired sol-gel-derived tube of dimensions 1 m long by 40 mm od by 17 mm id bowed to ≈3 mm maximum ($\Theta=0.34°$), with visible white deposit, was drawn at 1800° C. over a period of 25 min. to yield a straightened tube of dimensions 2 meters long by 28 mm od by 11.9 mm id, now free of visible deposit Draw speed was approximately 9 cm/min. The tube was of quality to pass inspection for use in a composite optical fiber preform. Other work shows tolerance for retention of cristobalite deposit. Accordingly, straightening is converted to amorphous silica during drawing of the composite preform.

EXAMPLE 2

A fired sol-gel tube as in Example 1 but of dimensions 60 cm long×25 mm od×19 mm id and bowed to $\Theta = 0.9°$ was disposed vertically and supported at its upper end. A 150 kg weight, was fastened to its free end. The weight was sufficient to straighten the unheated tube elastically. The strained tube was heated to a temperature of 1300° C. with a tube furnace providing for a 40 cm hot zone. Time of heating was approximately 30 minutes. As cooled and removed the tube had been straightened sufficiently to serve as overcladding.

I claim:

1. Process for making optical fiber by drawing from a composite preform consisting essentially of a rod enclosed within a near-net shape tubular body of critical straightness along its functional length, comprising introducing a sol into a tubular mold, at least partially gelling the sol while in the mold, drying and sintering, inserting the rod into the sintered tubular body, and shrinking the tube about the rod to result in a tightly fitting composite preform, characterized in that in a process step prior to inserting the rod, the sintered tubular body is subjected to a separate drawing step in which it is placed under tensile force and heated to a temperature sufficient to result in plastic flow, in which the force and time of application are such as to reduce the cross-sectional area of the body of a maximum of up to 10%, in which the cross-sectional area is measured in a direction orthogonal to the tensile force, whereby the sintered tubular body is straightened to permit insertion of the rod.

2. Process of claim 1 in which the tubular body, prior to insertion of the rod, is essentially non-porous and amorphous, and is straight to a value of $\Theta$ of 0°–0.15°, where $\Theta$ is the maximum angle by which the axis of the body varies along its functional length an din which the composite product is drawn to yield a fiber.

3. Process of claim 1 for fabrication of a plurality of composite products and in which the separate drawing step is applied only to those products requiring straightening to enable insertion of the rod.

4. Process of claim 3 in which cross-sectional area reduction is a maximum of 5%.

5. Process of claim 1 in which the inside diameter of the body is oversized so that the separate drawing step yields a body of desired smaller diameter.

6. Process of claim 1 in which the wall thickness of the body immediately prior to application of tensile force is in excess of that required, and in which the body is internally pressurized by use of an inert gas during plastic flow so that wall thickness is disproportionately decreased to an amount greater than outside diameter.

7. Process of claim 1 in which the drawing step is a regular part of the process.

8. Process of claim 1 in which the body is disposed vertically during the drawing step.

9. Process of claim 8 in which during drawing the body is affixed at its upper end and in which the tensile force is produced by a weight attached to its lower end.

10. Process of claim 9 in which temperature sufficient to result in plastic flow is induced subsequent to application of tensile force.

11. Process of claim 1 in which the body is held in a lathe during the drawing step.

* * * * *